United States Patent [19]
Mancl et al.

[11] Patent Number: 5,465,016
[45] Date of Patent: Nov. 7, 1995

[54] ELECTRIC MOTOR AND BRUSH/SHUNT ASSEMBLY THEREFOR

[75] Inventors: Dennis J. Mancl, Bluff City; Donald C. Johnson, Johnson City, both of Tenn.; Paul W. Havens, Abingdon, Va.

[73] Assignee: Electrolux Corporation, Atlanta, Ga.

[21] Appl. No.: 118,129

[22] Filed: Sep. 8, 1993

[51] Int. Cl.$^6$ ............................. H02K 5/14; H02K 13/00
[52] U.S. Cl. .................................................. 310/71; 310/249
[58] Field of Search ............................. 310/71, 248, 249, 310/251; 427/116, 117, 118, 119, 120

[56] References Cited

U.S. PATENT DOCUMENTS

| | | | |
|---|---|---|---|
| 599,781 | 3/1898 | Gutmann | 310/239 |
| 2,188,809 | 1/1940 | Dow | 15/16 |
| 2,914,689 | 11/1959 | Weeks | 310/247 |
| 3,979,615 | 9/1976 | Neff | 310/71 |
| 4,038,573 | 7/1977 | Hillyer et al. | 310/71 |
| 4,059,776 | 11/1977 | Schreiber et al. | 310/242 |
| 4,132,460 | 1/1979 | Porta | 339/119 R |
| 4,157,483 | 6/1979 | Frimley | 310/242 |
| 4,163,167 | 7/1979 | Zelt et al. | 310/242 |
| 4,177,397 | 12/1979 | Lill | 310/71 |
| 4,190,781 | 2/1980 | Sauerwein et al. | 310/239 |
| 4,250,613 | 2/1981 | Sauerwein et al. | 29/597 |
| 4,266,843 | 5/1981 | Marsh et al. | 339/97 R |
| 4,322,647 | 3/1982 | Neroda et al. | 310/71 |
| 4,442,370 | 4/1984 | Veyssiere | 310/239 |
| 4,469,967 | 9/1984 | Grierson et al. | 310/71 |
| 4,494,026 | 1/1985 | Abe | 310/89 |
| 4,498,230 | 2/1985 | Harris et al. | 29/597 |
| 4,513,214 | 4/1985 | Dieringer | 310/71 |
| 4,523,116 | 6/1985 | Dibbern, Jr. et al. | 310/71 |
| 4,539,500 | 9/1985 | Houben et al. | 310/230 |
| 4,550,268 | 10/1985 | Becker et al. | 310/239 |
| 4,613,781 | 9/1986 | Sanders | 310/239 |
| 4,617,486 | 10/1986 | Miyauchi et al. | 310/233 |
| 4,621,991 | 11/1986 | Smith et al. | 417/423 A |
| 4,673,837 | 6/1987 | Gingerich et al. | 310/239 |
| 4,677,329 | 6/1987 | Secoura | 310/71 |
| 4,698,534 | 10/1987 | Smith et al. | 310/89 |
| 4,749,365 | 6/1988 | Magnifico et al. | 439/396 |
| 4,774,430 | 9/1988 | Rodriguez et al. | 310/239 |
| 4,782,261 | 11/1988 | Crevling, Jr. et al. | 310/242 |
| 4,801,833 | 1/1989 | Dye | 310/239 |
| 4,868,441 | 9/1989 | Bulick | 310/239 |
| 5,004,943 | 4/1991 | Gagneux | 310/239 |
| 5,013,952 | 5/1991 | Sekine et al. | 310/239 |
| 5,039,898 | 8/1991 | Shiina | 310/239 |
| 5,055,728 | 10/1991 | Looper et al. | 310/91 |
| 5,159,221 | 10/1992 | Miyazaki et al. | 310/239 |
| 5,184,041 | 2/1993 | Baer et al. | 310/239 |
| 5,382,455 | 1/1995 | Bookmann | 427/429 |

FOREIGN PATENT DOCUMENTS 0553811  8/1993  European Pat. Off. .

Primary Examiner—Thomas M. Dougherty
Assistant Examiner—D. R. Haszko
Attorney, Agent, or Firm—Fish & Neave; Jeffrey H. Ingerman

[57] ABSTRACT

A brush/shunt assembly for an electric motor is provided. The shunt portion of the assembly is a stranded wire shunt with a joined (e.g., fused) end that can be easily inserted into a slotted terminal. A lubricant can be added to reduce insertion forces.

24 Claims, 7 Drawing Sheets

FIG. 7
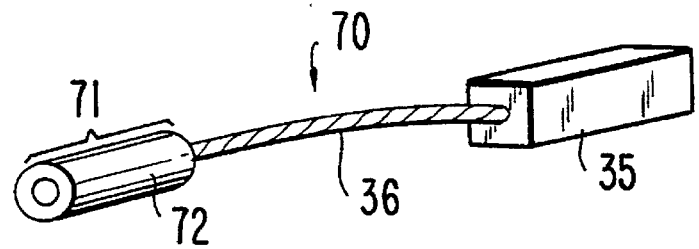
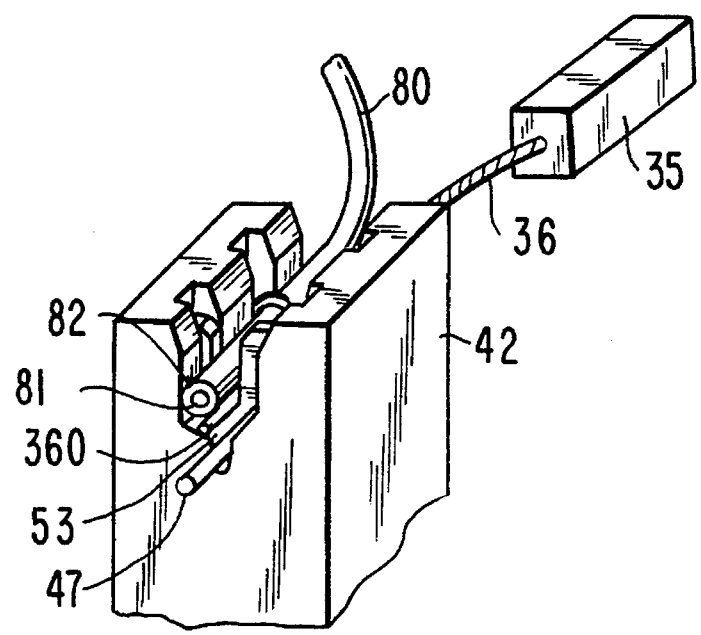
FIG. 8

ELECTRIC MOTOR AND BRUSH/SHUNT ASSEMBLY THEREFOR

BACKGROUND OF THE INVENTION

This invention relates to electric motors of the type having brushes for commutation. More particularly, this invention relates to a brush/shunt assembly having a stranded shunt and to a method of connecting the brush shunt to a termination point on an electric motor.

It is well-known that electric motors typically include a stationary stator portion and a rotor or armature mounted for rotation within the stator. The stationary stator portion includes a stator core in which the rotor rotates and may include other stationary parts of the motor such as a frame that holds the ends of the rotor shaft. The stator core is either a permanent magnet, which might be a ceramic material, or a material, such as a metal, capable of being magnetized. If the stator core is metallic, it typically includes one or more coils ("field coils" or "stator coils") wound around the stator core that transform the stator core into an electromagnet when connected to a source of electrical energy. The rotor also includes one or more coils ("armature coils" or "rotor coils") that produce a magnetic field in the rotor core when electrical energy is applied. The rotor rotates as the magnetic fields in the stator core and the rotor core repel one another.

In order to conduct electrical energy to the rotor coils, a commutator is mounted around the rotor shaft. The commutator includes two or more commutator bars or rings extending circumferentially around the shaft. Brushes secured to the stator core, or to a support structure attached to the stator core, make sliding contact with the commutator as the rotor rotates.

In many types of motors, it is necessary to use a conductor known as a shunt to connect each brush to a termination point on the stationary stator portion, which is also connected either to one of the stator coils or to a source of electrical energy, or both (depending on whether, e.g., the motor is a series-type motor or a shunt-type motor, or a permanent magnet motor as opposed to a motor having stator windings).

Brushes are typically urged—e.g., by springs—toward the commutator so that contact is maintained as the brush wears down. In order for the shunt to be sufficiently flexible so as not to interfere with movement of the brush under the action of the spring, the shunt is frequently made from fine stranded wire, which may be braided or twisted.

One type of termination that is commonly used to make connections on a stator assembly is a terminal having a slot between two arms that are urged toward one another. A wire is inserted in the slot and is held in place by the arms. The arms also have sharp edges which cut into the surface of the wire, both to cut through any insulation or insulating coating (which is common on wire used for coil windings) and to assure good mechanical and electrical contact. Heretofore, it has not been possible to use such terminals with uninsulated stranded wire, such as brush shunts, because the sharp edges would cut through the strands and the shunt would fail, or at best would achieve poor electrical contact.

As a result, when stranded wire shunts are used in electric motors, it is common to terminate the stator coil to a slotted terminal and then provide a separate terminal, electrically connected to the slotted terminal, for connecting the shunt. For example, a one-piece terminal having a male quick-disconnect tab on one end and a slotted termination portion on the other end could be mounted on the stator assembly. The stator coil would be electrically terminated to the slotted terminal portion. A female quick-disconnect terminal could be-connected to the end of the shunt, as by crimping, soldering or both. The male and female quick-disconnect terminals are then mated to one another. This requires providing (1) an additional terminal on the shunt, (2) a crimping or soldering step, and (3) a terminal mating step. The connection of the shunt to the stator thus becomes time-, labor- and material-intensive.

In addition, if accessory components are to be electrically connected to the motor circuit—e.g., if a light bulb for use as a headlight in a powered vacuum cleaner nozzle is to be connected in parallel with the armature coils of the nozzle motor—it is common to mount an additional terminal on the end of each accessory lead and a mating terminal, electrically connected to the shunt terminal, on the stator assembly. Alternatively, a two-into-one adaptor can be attached to the existing stator terminal, to which separate terminals on the ends of the shunt and the accessory lead are both mated. Either approach adds to the cost in time, labor and material.

It would be desirable to be able to provide a way to quickly and easily connect a stranded brush shunt wire to a terminal on a stator assembly.

It would also be desirable to be able to minimize the number of terminals needed on a stator assembly to accomplish all of the necessary stator connections.

SUMMARY OF THE INVENTION

It is an object of this invention to provide a way to quickly and easily connect a stranded brush shunt wire to a terminal on a stator assembly.

It is also an object of this invention to minimize the number of terminals needed on a stator assembly to accomplish all of the necessary stator connections.

In accordance with this invention, there is provided a brush/shunt assembly for use in a dynamo-electric machine. The assembly comprises a commutator brush and a stranded wire shunt connected at a first end thereof to the brush and having a second end for connection to a terminal on a stationary stator portion of the dynamo-electric machine. The stranded wire shunt has an end stiffened for insertion into the terminal, preferably by fusing or welding the strands in the end together. Preferably, the stiffened end of the shunt is lubricated for insertion into the terminal, as with beeswax or paraffin.

A motor incorporating the assembly, and a method of connecting such a shunt, are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 7 is a perspective view of an alternative embodiment of a brush/shunt assembly according to the present invention; and FIG. 8 is an enlarged perspective view of the connection of an accessory lead in accordance with the present invention.

DETAILED DESCRIPTION OF THE INVENTION

Figure 1:
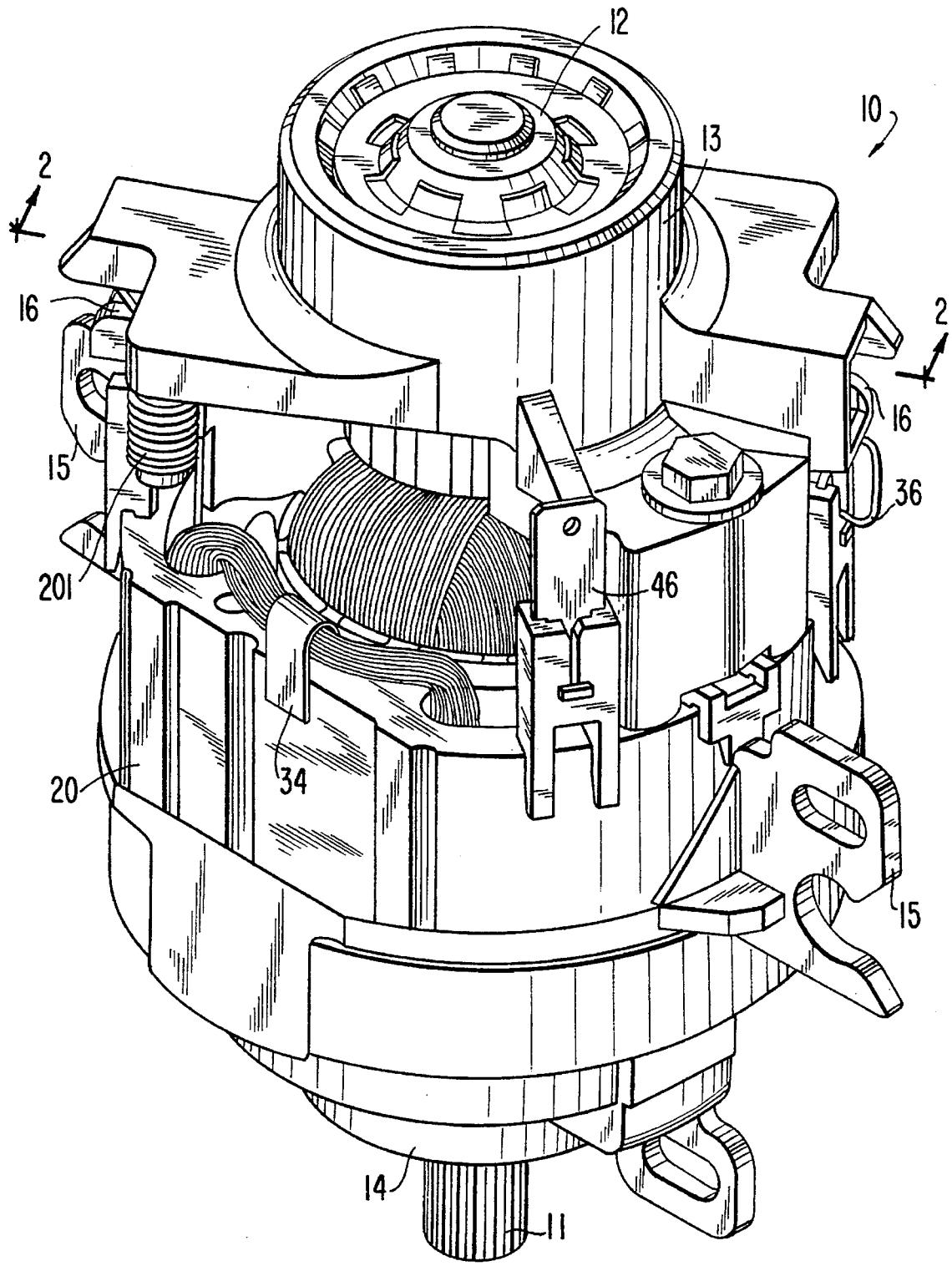
FIG. 1 is a perspective view of a first preferred embodiment of an electric motor incorporating the present invention.

The present invention allows the connection of a stranded wire brush shunt (or any other stranded wire) to a slotted terminal of the type described above. Thus, in the context of an electric motor, or other dynamo-electric machine such as a generator, additional steps and materials for attaching additional terminals to allow connection of a stranded shunt are eliminated. Further, the number of terminals that must be mounted on the stator assembly, where there is limited space, can be reduced by simplifying the connection of accessory leads.

In accordance with the present invention, the strands at the end of a stranded wire shunt are stiffened before the end is inserted into a slotted terminal of the type described above. The strands can be stiffened in a number of ways.

First, the stranded wire shunt can be securely held at gripping point spaced away from the end to be inserted into the terminal. The end can then be grasped and twisted to form a segment, between the end and the gripping point, where the strands are tightly bunched together, effectively forming a more rigid conductor along that segment. The end and the gripping point can then continue to be held securely as the segment between them is inserted into the slotted terminal. The method of insertion can be simply to move the two gripped points toward the stator after aligning the gripped segment with the slot in the terminal, or a conventional insertion tool designed for such terminals can be used to press the segment into the slot.

Second, the end of the stranded shunt can be joined together to stiffen the end. For example, the ends can be welded together—i.e., the individual strands at the end can be melted together into a single solid conductor. Similarly, the individual strands can be fused—i.e., they can be heated just enough that the surfaces of the individual strands adhere to one another, but the individual strands do not lose their separate identities as they do in the case of welding. Alternatively, the individual strands could be soldered together at the end of the shunt. For all of these methods, insertion is preferably carried out with the tool described above, but can be carried out by gripping the shunt at two points as described above.

Slotted terminals of the type described above are designed for use with solid wire (also known as "magnet wire") of the type used for coils in dynamo-electric machines. Such solid wire generally has a smooth round cross section, and the terminal is designed for the insertion resistance that would be encountered with such wire. However, the prepared shunt wire produced by stiffening the strands at the end of a stranded shunt in accordance with the present invention is neither round nor smooth. Rather, the surface is relatively rough or "lumpy," giving rise to greater resistance to insertion into the terminal. As a result, some of the strands may break on insertion, and higher than expected contact resistance or shunt fatigue failures may also result.

According to a second aspect of the present invention, then, it has been found that application of a lubricant to the stiffened end of the shunt substantially eliminates the insertion resistance. The insertion forces needed when a lubricant is used are substantially the same as are required for a standard solid wire. A particularly preferred lubricant for this purpose is beeswax. Paraffin is also a preferred lubricant. Other lubricants can also be used, but care should be taken that the selected lubricant does not degrade any polymeric components used in the motor, including plastic terminal connectors and wire insulation, and that it does not affect the electrical quality of the connection.

A preferred embodiment of an electric motor incorporating the present invention is shown in FIGS. 1–4. Motor 10 includes a stator 20 having a core 30 made of a stack of laminations 22, and an armature 21 also having a core made of laminations 22. The stator laminations and rotor laminations differ in cross section (not shown). In armature 21, the laminations 22 are stacked on a shaft 23, the protruding end 11 of which is used to drive a load (not shown).

Figure 2:
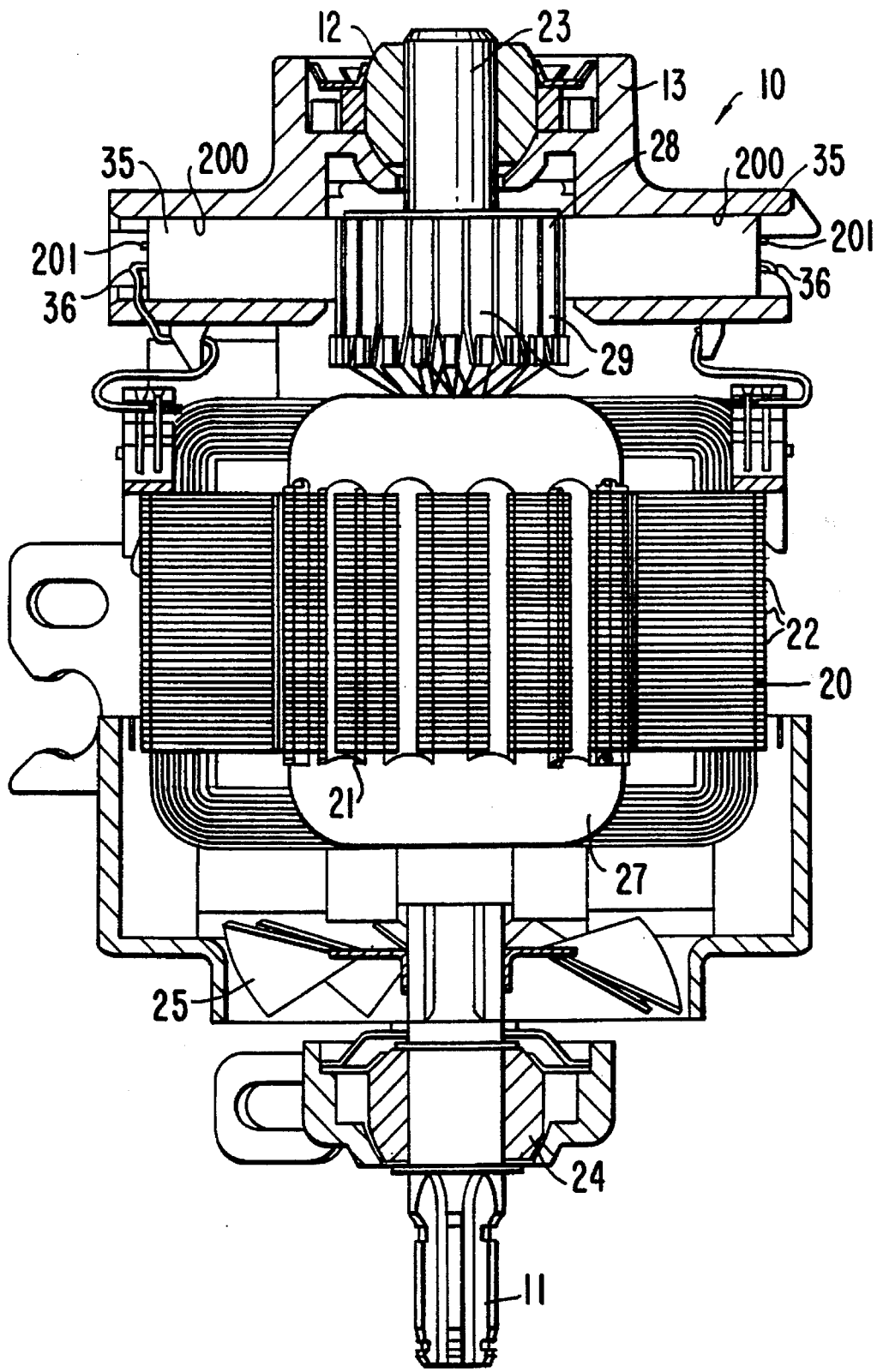
FIG. 2 is an axial cross-sectional view, taken from line 2—2 of FIG. 1, of the motor of FIG. 1.
Figure 3:
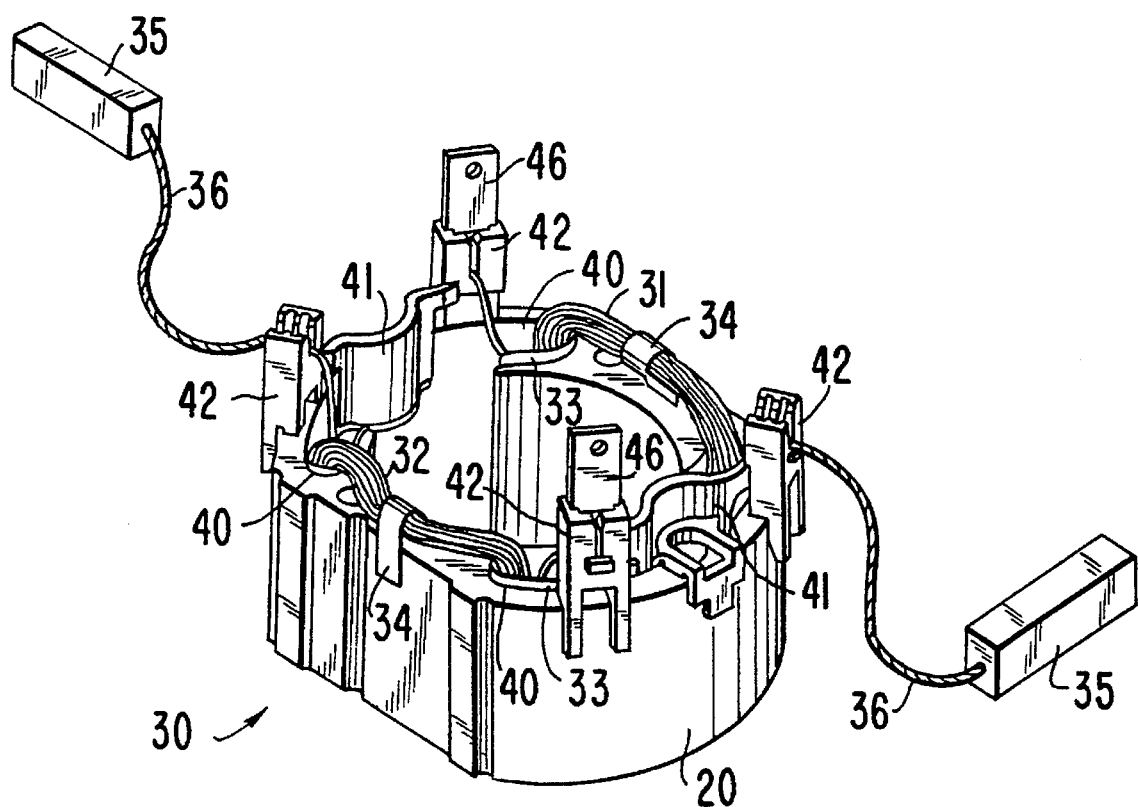
FIG. 3 is a perspective view of the stator of the motor of FIGS. 1 and 2.
Figure 4:
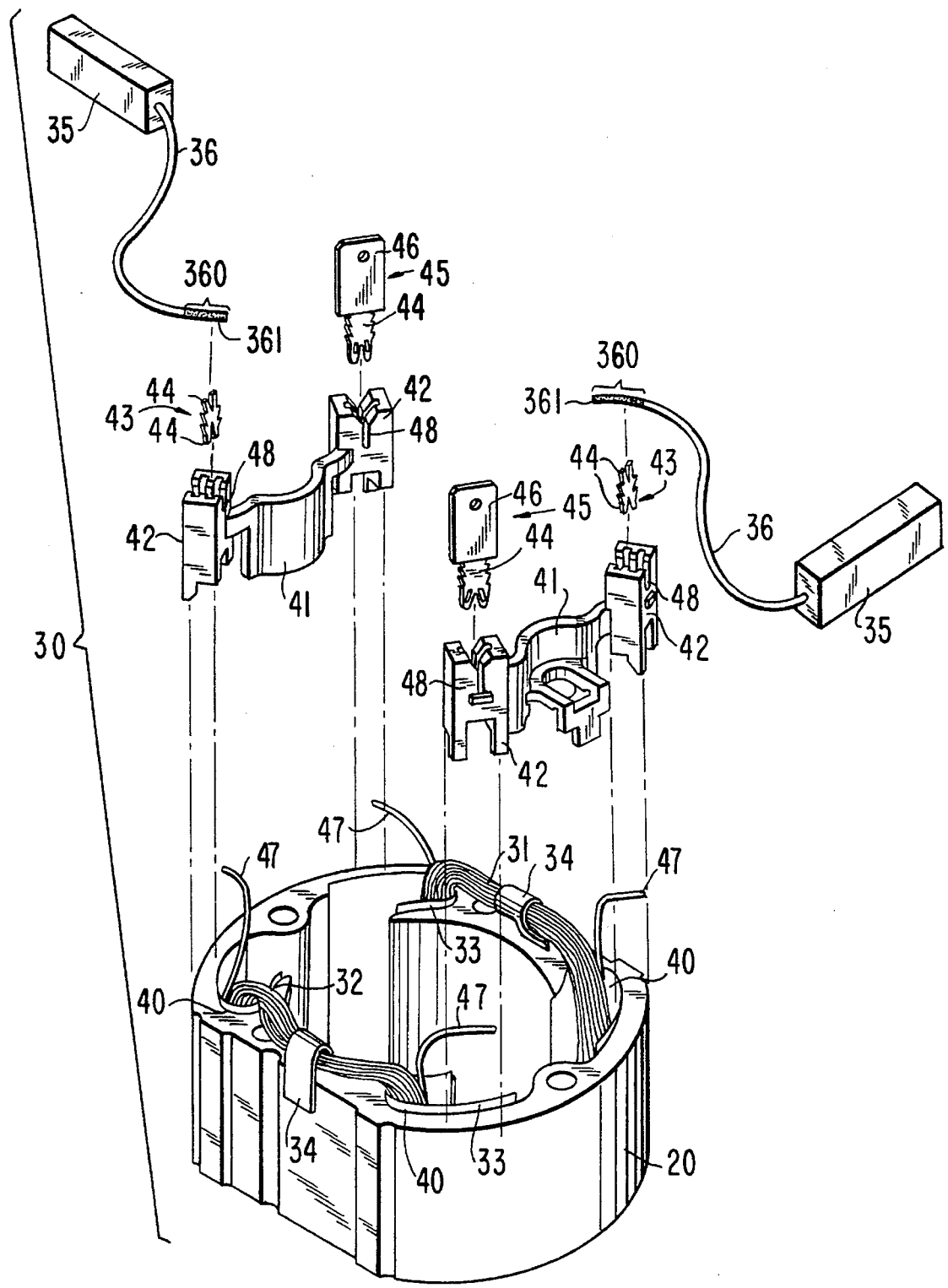
FIG. 4 is a partially exploded perspective view of the stator of FIG. 3.

One end of shaft 23 rests in bearing 12 in a plastic bearing/brush housing 13 mounted on one end of stator core 30. As shown in FIG. 2, bearing 12 is a sleeve bearing. The other end of shaft 23 passes through a similar sleeve bearing 24. A second bearing housing 14 houses bearing 24 and also has tabs 15 for mounting motor 10 to a device in which it is used. Housing 14 also houses a cooling fan 25 mounted on shaft 23, which forces cooling air through motor 10 as it operates.

Stator core 30 has two stator or field coils 31, 32 wound in recesses 40 provided in stator core 30 for that purpose. Recesses 40 are preferably lined with paper liners 33 (blocking the view of laminations 22 inside portions of core 30) to assist in preventing short circuits between stator coils 31, 32 and stator core 30. The portions of stator coils 31, 32 protruding above the top and below the bottom of stator core 30 are held in place by retainers 34, which typically are stiff, paper-covered metallic ribbons.

Mounted on one end of stator core 30 are two plastic terminal boards 41, preferably made of nylon, each having two terminal pockets 42. In the embodiment shown in FIGS. 1–4, motor 10 is a series-wound AC motor, in which stator coils 31, 32 are connected in series, with armature coils 27 connected in series between them. To facilitate that connection mode, two of the four terminal pockets 42 house "siamese" terminals 43 having on each end slotted terminals 44 of the type described above (such siamese terminals are available from Amtronics, Inc., of Brooklyn, N.Y. and are sold under the trademark SIAMEZE®), and the other two terminal pockets 42 house terminals 45 having the slotted terminal 44 on the lower half and a flag- or tab-type terminal 46 on the upper half (such terminals are also part of the family of products available from Amtronics, Inc. under the trademark SIAMEZE®). Each of the four stator coil leads 47 is placed in a slot 48 in a respective terminal pocket 42 and the corresponding terminal 43, 45 is then placed in terminal pocket 42 to receive lead 47 in the slot of slotted terminal 44, in a configuration in which one lead of each stator coil 31, 32 is connected to a terminal 43 and the other lead of each stator coil 31, 32 is attached to a terminal 45.

Armature or rotor 21 has a plurality of armature coils 27 terminated to a commutator 28. To accommodate the plurality of coils 27, commutator 28 is segmented into a number of segments 29 equal to twice the number of coils 27 (i.e., one segment 29 for each end of each coil 27).

The supply of electrical power to motor 10 is connected to the two tabs 46 of the two terminals 45, thereby connecting power to one end of each of stator coils 31, 32. To complete the series connection to armature coils 27, brushes 35 are connected by shunts 36 to the upper terminals 44 of each of the two terminals 43.

Brushes 35 are housed in brush channels 200 of bearing/brush housing 13, and preferably are made of graphite. Brushes 35 are urged in channels 200 toward commutator 28 by springs 201 (only one shown) acting on each respective brush 35 through slot 16 in the wall of each respective channel 200.

Brush shunts 36 are preferably braided wire shunts, preferably braided from six bundles, each including 25 strands of copper wire, each strand having a diameter of about 0.002 inch (about 0.051 mm). Each shunt 36 is terminated by insertion into the slot 53 of upper slotted terminal 44 of terminal 43, which slot is accessible in slot 48 of a respective terminal pocket 42.

In accordance with the present invention, the insertion of shunt 36 into slot 53 of upper terminal 44 is facilitated by joining the strands in end 360 of shunt 36, to stiffen end 360, in any of the ways described above. Also as described above, a coating 361 of lubricant, such as, preferably, beeswax or paraffin, is applied preferably to end 360 of shunt 36 to ease insertion of end 360 into terminal 43.

Figure 5:
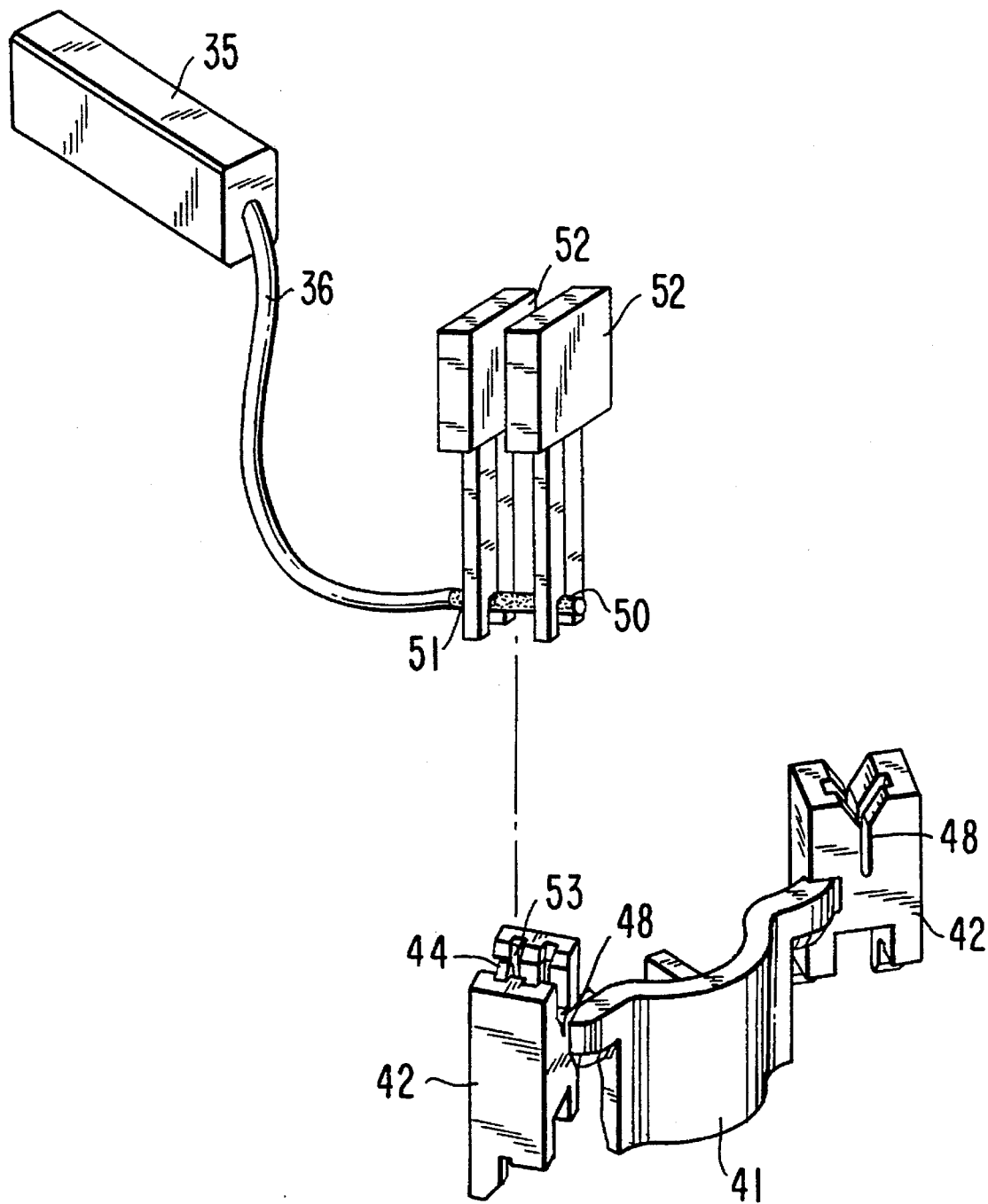
FIG. 5 is a perspective view of one method of inserting a brush shunt according to the invention into a terminal.
Figure 6:
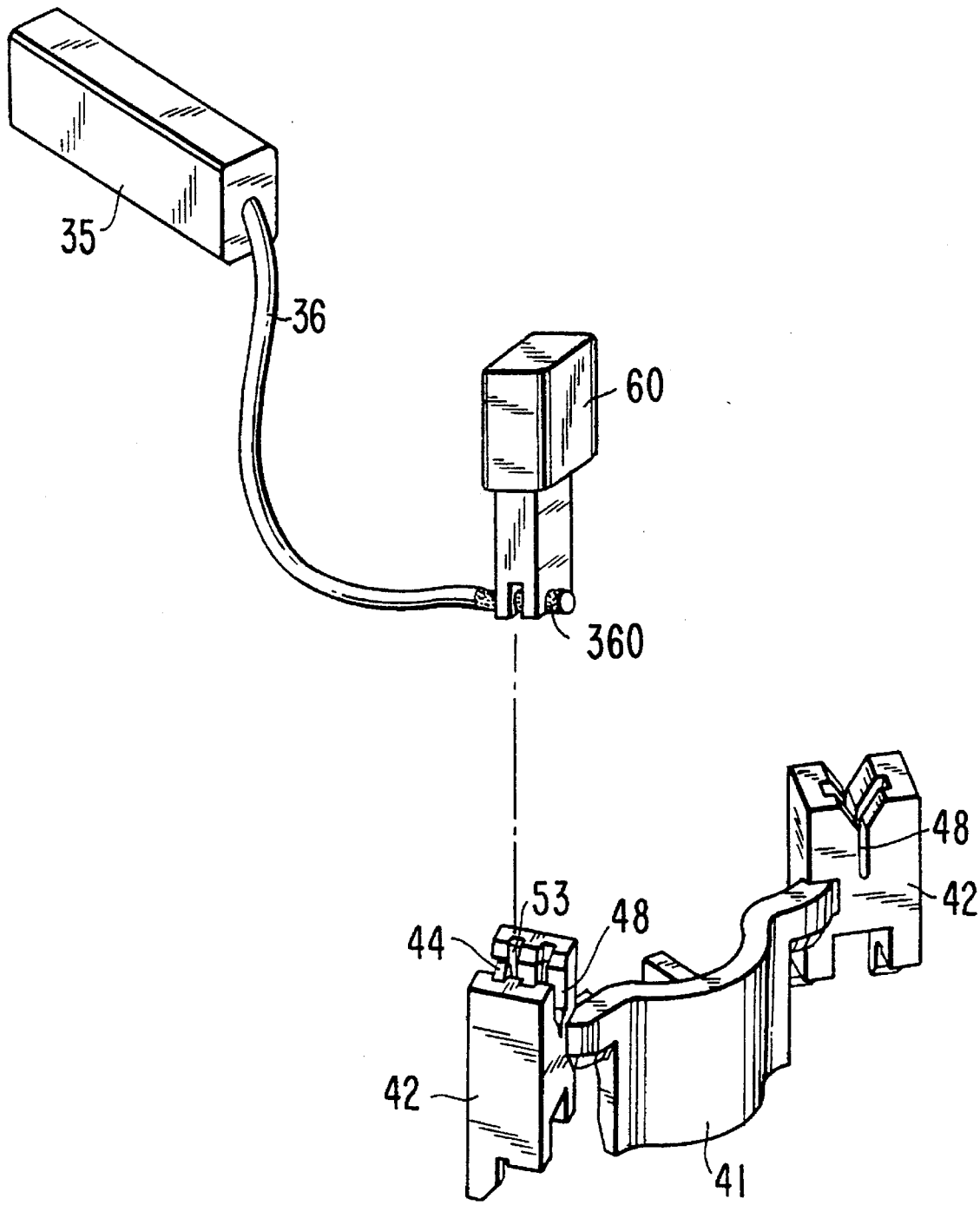
FIG. 6 is a perspective view of a second method of inserting a brush shunt according to the invention into a terminal.

Two different methods of inserting end 360 into the slot of terminal 44 are shown in FIGS. 5 and 6. In FIG. 5, end 360 is gripped at its extremity 50 and at a second gripping point 51 in appropriate tools 52, and aligned with slot 53 of terminal 44, and the tools 52 are urged downward to insert end 360 into slot 53. As discussed above, this gripping can also be the method of stiffening end 360. In FIG. 6, a special tool 60 is used to force end 360 into slot 53.

FIG. 7 shows a second preferred embodiment of a brush/shunt assembly 70 according to the present invention. Brush/shunt assembly 70 include brush 35 and shunt 36 as above. However, instead of a joined end 360, shunt 36 of assembly 70 has an end 71 jacketed with a polymeric jacket 72. Jacket 72 can be a thermoplastic material such as polyvinyl chloride (PVC). The provision of jacket 72 serves the "lubricating" function described above, eliminating the need for applying lubricant 361. Jacket 72 also serves the stiffening function described above, although a separate joining step may still be used before jacket 72 is applied, if desired.

Jacket 72 can be applied in several ways. First, a bath of the appropriate polymeric substance can be supplied in liquid form. End 71 of brush 36 can be dipped into the bath and cured. Another option is to provide jacket 72 as a preformed tube of shrinkable material which is placed over end 71 and then shrunk to fit tightly onto end 71. The shrinkable material is preferably heat-shrinkable and is shrunk by the application of heat, but other types of shrinkable materials may be used.

In any case, care should be taken in jacketing end 71 not to jacket any more of shunt 36 than is necessary for insertion into terminal 44. If too much of shunt 36 is jacketed, shunt 36 may lose the flexibility it was designed to have that allows brush 35 to follow the urging of spring 201. On the other hand, jacketing a portion of end 71 provides an extra measure of strain relief as jacket 72 bears much of any load placed on the termination of shunt 36 to terminal 44.

The slotted terminals 44 under which the present invention is to be cited are ordinarily designed to have one wire lead inserted in each terminal slot 53. However, it has been found that with unjacketed stiffened shunt ends 360 such as those of the present invention, sufficient space remains in slot 53 for insertion of an additional lead 80, as shown in FIG. 8, if lead 80 is sufficiently small. Thus, the power leads for connection to the external power source would likely be too large. However, if lead 80 were for connection of an accessory device, such as a light bulb (not shown) to be used as the headlight of a powered vacuum cleaner nozzle incorporating motor 10, there should be sufficient room in slot 53 for connection of lead 80. In such a case, lead 80 would have a conductor 81 surrounded by insulating jacket 82. In order to ensure that lead 80 remains securely in slot 53, a locking staple 83, such as that sold by Amtronics, Inc. under the trademark LEAD-LOK®, is preferably applied.

Thus, a brush/shunt assembly having a joined end, and a motor incorporating the assembly, are provided. One skilled in the art will appreciate that the present invention can be practiced by other than the described embodiments, which are presented for purposes of illustration and not of limitation, and the present invention is limited only by the claims that follow.

What is claimed is:

1. A dynamo-electric machine comprising:

a stationary stator portion including a stator core;

an armature mounted for rotation in said stator core;

at least one armature coil wound on said armature;

a commutator mounted on said armature to which said at least one armature coil is terminated;

at least one brush for contacting said commutator;

at least one terminal mounted on said stator, said terminal having a pair of electrically conductive arms and a slot between said pair of electrically conductive arms for receiving a lead, said arms exerting an inward force on said lead for retaining said lead and for making electrical contact therewith; and at least one stranded wire shunt for connecting said at least one brush to said at least one terminal, said at least one stranded wire shunt having an end lacking an insulation sheath and stiffened without use of an additional rigid element; wherein:

when said dynamo-electric machine is assembled, said stiffened end of said stranded wire shunt lacking said insulation sheath is inserted between said electrically conductive arms of said terminal.

2. The dynamo-electric machine of claim 1 wherein said stiffened end of said stranded wire shunt lacking said insulation sheath is lubricated for ease of insertion between said arms of said terminal.

3. The dynamo-electric machine of claim 2 wherein said stiffened end of said stranded wire shunt lacking said insulation sheath is lubricated with beeswax.

4. The dynamo-electric machine of claim 2 wherein said stiffened end of said stranded wire shunt lacking said insulation sheath is lubricated with paraffin.

5. The dynamo-electric machine of claim 1 wherein ends of strands in said stranded wire shunt are stiffened by being joined together to form said bare stiffened end lacking said insulation sheath.

6. The dynamo-electric machine of claim 5 wherein said ends of said strands in said stranded wire shunt are joined by being welded together to form said stiffened end lacking said insulation sheath.

7. The dynamo-electric machine of claim 5 wherein said ends of said strands in said stranded wire shunt are joined by being fused together to form said stiffened end lacking said insulation sheath.

8. The dynamo-electric machine of claim 5 wherein said bare ends of said strands in said stranded wire shunt are joined by being soldered together to form said bare stiffened end lacking said insulation sheath.

9. The dynamo-electric machine of claim 1 further comprising:

a stator coil wound on said stator core and having two ends, one of said ends being electrically connected to said at least one terminal; and a second terminal mounted on said stator core, a second of said ends of said stator coil being electrically connected to said second terminal.

10. The dynamo-electric machine of claim 9 further comprising:

a second brush for contacting said commutator;

a third terminal mounted on said stator core; and a second of said at least one stranded wire shunt for connecting said second brush to said third terminal.

11. The dynamo-electric machine of claim 10 further comprising:

a second stator coil wound on said stator core and having two ends, one of said ends of said second stator coil being connected to said third terminal; and a fourth terminal mounted on said stator core, a second of said ends of said second stator coil being connected to said forth terminal; wherein:

said second and fourth terminals are for connection to a source of electrical power.

12. An electric motor comprising:

a stationary stator portion including a stator core;

a rotatable armature mounted for rotation within said stator core;

at least one armature coil wound on said armature;

a commutator on said armature to which said at least one armature coil is terminated;

at least one brush for contacting said commutator;

a respective stranded brush shunt for electrically connecting each said brush at a proximal end of said shunt to a respective termination point on said stationary stator portion at a distal end of said shunt lacking an insulation sheath, said respective termination point being a slotted terminal having a slot for receiving said distal end between a pair of electrically conductive arms, said distal end of said stranded brush shunt lacking said insulation sheath being stiffened without use of an additional rigid element for insertion into said slot, said arms exerting an inward force on said stiffened distal end lacking said insulation sheath for retaining said one of said stranded brush shunts and for making electrical contact therewith; and an electric light source having at least one lead connected to one of said respective termination point, said one of said leads being inserted also in said slot between said conductive arms.

13. A brush/shunt assembly for use in a dynamo-electric machine, said assembly comprising:

a commutator brush; and a stranded wire shunt connected at a first end thereof to said commutator brush and having a second end for connection to a terminal on a stationary stator portion of said dynamo-electric machine, said second end of said stranded wire shunt (a) lacking an insulation sheath, and (b) being stiffened without use of an additional rigid element for insertion into said terminal.

14. The assembly of claim 13 wherein said stiffened end of said shunt lacking said insulation sheath is lubricated to reduce resistance to insertion into said terminal.

15. The assembly of claim 14 wherein said stiffened end of said shunt lacking said insulation sheath is lubricated with beeswax.

16. The assembly of claim 14 wherein said stiffened end of said shunt lacking said insulation sheath is lubricated with paraffin.

17. The assembly of claim 13 wherein ends of strands in said stiffened end of said shunt lacking said insulation sheath are welded together.

18. The assembly of claim 13 wherein ends of strands in said stiffened end of said shunt lacking said insulation sheath are fused together.

19. The assembly of claim 13 wherein ends of strands in said stiffened end of said shunt lacking said insulation sheath are soldered together.

20. The electric motor of claim 12 further comprising a locking fastener in said slot for securing said one of said brush shunts and said one of said leads in said slot.

21. The electric motor of claim 12 wherein ends of strands in said stranded brush shunt are stiffened by being joined together to form said bare, stiffened distal end lacking said insulation sheath.

22. The electric motor of claim 21 wherein said ends of said strands in said stranded brush shunt are joined by being welded together to form said stiffened distal end lacking said insulation sheath.

23. The electric motor of claim 21 wherein said ends of said strands in said stranded brush shunt are joined by being fused together to form said stiffened distal end lacking said insulation sheath.

24. The electric motor of claim 21 wherein said ends of said strands in said stranded brush shunt are joined by being soldered together to form said stiffened distal end lacking said insulation sheath.

* * * * *